United States Patent
Wiegemann et al.

(10) Patent No.: US 6,235,368 B1
(45) Date of Patent: May 22, 2001

(54) MAGNETIC RECORDING MEDIUM HAVING A HIGH RECORDING DENSITY AND ITS PRODUCTION

(75) Inventors: Hans-Bertram Wiegemann, Schriesheim; Peter Stehle, Willstätt; Hansjörg Traub, Neuried; Helmut Jakusch, Frankenthal, all of (DE)

(73) Assignee: EMTEC Magnetics GmbH, Ludwigshafen (DE)

( * ) Notice: Subject to any disclaimer, the term of this patent is extended or adjusted under 35 U.S.C. 154(b) by 0 days.

(21) Appl. No.: 09/157,598

(22) Filed: Sep. 21, 1998

(30) Foreign Application Priority Data

Oct. 24, 1997 (DE) .............................. 197 47 068

(51) Int. Cl.[7] ................................................. G11B 5/716
(52) U.S. Cl. ..................... 428/65.3; 428/216; 428/328; 428/694 BM; 428/694 BS; 428/694 BA; 428/900; 427/548
(58) Field of Search ............... 428/694 BM, 694 BS, 428/900, 216, 65.3, 328, 694 BA; 427/548

(56) References Cited

U.S. PATENT DOCUMENTS

| | | | |
|---|---|---|---|
| 2,819,186 | 1/1958 | Franck | 117/26 |
| 4,578,280 | 3/1986 | Greiner | 427/47 |
| 4,769,293 | * 9/1988 | Hosoo et al. | 428/694 |
| 5,009,877 | * 4/1991 | Steck et al. | 423/607 |
| 5,455,093 | 10/1995 | Kawamata | 428/65.3 |
| 5,455,112 | 10/1995 | Inaba | 428/323 |
| 5,582,910 | 12/1996 | Araki et al. | 428/323 |
| 5,601,647 | 2/1997 | Pertzsch | 118/419 |
| 5,641,355 | 6/1997 | Munch | 118/410 |
| 5,700,541 | 12/1997 | Okita et al. | 428/65.4 |
| 5,704,978 | 1/1998 | Maniwa | 118/410 |

FOREIGN PATENT DOCUMENTS

| | | |
|---|---|---|
| 566 100 | 10/1993 | (EP) . |
| 566 378 | 10/1993 | (EP) . |
| 682 802 | 11/1995 | (EP) . |
| 520 155 | 8/1996 | (EP) . |
| 2 299 437 | 10/1996 | (GB) . |
| 2 299 438 | 10/1996 | (GB) . |
| 2 299 439 | 10/1996 | (GB) . |
| 8167137 | 6/1996 | (JP) . |
| 96/35210 | 11/1996 | (WO) . |

OTHER PUBLICATIONS

IEEE Trans. Magn. 32, 1996, 4048–4053, Veitch.
English trans PCT WO 96/30900.
English trans DE 195 04930.
English trans DE 195 11 872.

* cited by examiner

*Primary Examiner*—Stevan A. Resan
(74) *Attorney, Agent, or Firm*—Keil & Weinkauf

(57) ABSTRACT

A magnetic recording medium which consists of at least two layers cast one on top of the other is described, the lower layer containing acicular magnetic pigments having a field strength of 5–40 kA/m and a magnetization of 20–70 nTm$^3$/g and the upper layer containing a high-density metal powder dispersion. After application of the layers, the magnetic recording medium is subjected to a magnetic disorientation treatment while the layers are in the wet state, so that said recording medium has virtually no magnetic and mechanical anisotropy. The magnetic recording medium produced in this manner is particularly suitable for floppy disks having a high storage capacity of substantially more than 100 megabytes.

12 Claims, 1 Drawing Sheet

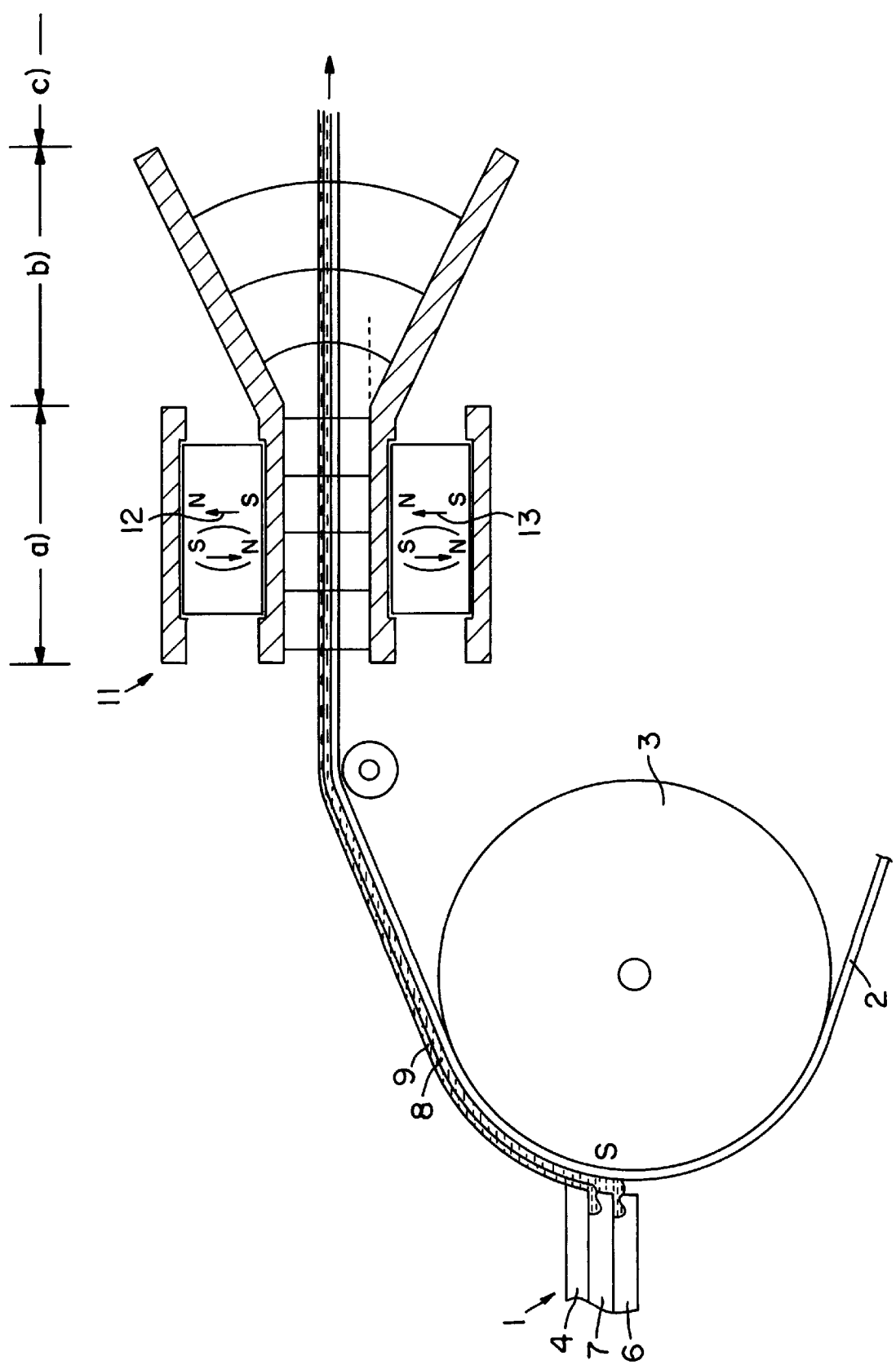

MAGNETIC RECORDING MEDIUM HAVING A HIGH RECORDING DENSITY AND ITS PRODUCTION

FIELD OF THE INVENTION

The present invention relates to a magnetic recording medium consisting of at least two layers which are cast on a nonmagnetic substrate, the lower layer containing a binder and at least one acicular pigment and the upper layer containing a binder and a ferromagnetic metal pigment and having a thickness of not more than 0.4 $\mu$m. The present invention also relates to a process for the production of such magnetic recording media which have no preferred magnetic direction.

BACKGROUND OF THE INVENTION

With modern magnetic recording media, there is a constant desire for higher storage capacities. faster access times and higher transmission rates of the stored information. For magnetic recording media, these requirements mean on the one hand a continuous increase in the relative speed between medium and magnetic head and on the other hand a continuous reduction in the thickness of the magnetic layer. For example, magnetic recording media having a high storage capacity now have magnetic layers which are less than about 1 $\mu$m thick and relative speeds between recording medium and head which are in the region of several meters per second.

Particularly in the case of data diskettes with storage capacities of 100 megabytes or more, the thickness of the recording layer is already substantially below 0.5 $\mu$m with relative speeds of more than 10 m/s. In this type of magnetic media, the magnetic head frequently remains on one and the same track during use, setting extreme requirements with respect to the abrasion resistance of the recording layer.

To meet this requirement, magnetic recording media in which a binder-free ferromagnetic metal layer was applied in a very small thickness by means of a vacuum technique have been developed in recent years. Although these metal evaporated recording media achieve a very high playback level, mass production of such media still presents considerable difficulties in comparison with magnetic recording media in which the magnetic pigments are dispersed in binders. Moreover, these ME tapes change under the influence of atmospheric oxygen. However, it has recently been possible to meet the requirement for small layer thickness also by means of a thin magnetic layer in which the finely divided magnetic particles are dispersed in a polymeric binder matrix and in which this layer is cast onto a nonmagnetic lower layer. Such recording media are described, for example, in U.S. Pat. No. 2 819 186, DE-A 43 02 516, EP 0 520 155, EP 0 566 100, EP 0 566 378, EP 0 682 802 and DE-A 44 43 896, 195 04 930, 195 11 872, 195 11 873, 195 11 875 and 195 11 876.

The abovementioned magnetic recording media describe media which have a two-layer structure and in which the upper, magnetic layer has a thickness of from 0.01 to slightly below 1 $\mu$m, preferably 0.1–0.4 $\mu$m. The thickness of the lower, nonmagnetic layer is 0.5–8 $\mu$m. The upper layer preferably contains finely divided magnetic metal or metal alloy particles while the lower, nonmagnetic layer contains finely divided nonmagnetic pigments which in some cases have an acicular structure, as described, for example, in the abovementioned publications 20 EP 0 566 378 and EP 0 682 802. From a comparison of the thicknesses of the part-layers, it is clear that the mechanical properties are essentially determined by the thicker lower layer.

In conventional recording media, the mechanical stability and the abrasion resistance of magnetic recording media can be increased by adding acicular pigments in contrast to pigments of isotropic shape, particularly when the pigments are arranged in a suitable manner. In the case of media which have a preferred direction, such as, for example, tape-like magnetic recording media, an arrangement in this direction is advisable, as described in the PCT application 96/30900 of the same Applicant. In the case of acicular magnetic pigments, this orientation can be further substantially improved by orienting the pigments in a strong magnetic field.

To ensure that the required high recording density is achieved, acicular pigment particles can be used only in the nonmagnetic lower layer for improving the mechanical properties. In this application, the orientation of the nonmagnetic acicular pigment particles is supported by the coating process itself since, owing to the shear gradient inevitably produced during application, some of the pigment needles are oriented in the coating direction.

However, in the case of disk-shaped recording media, i.e. floppy disks, an anisotropic orientation is harmful since the relative direction of movement of the magnetic head relative to the preferred direction of the pigment needles changes continuously during one revolution. Here on the contrary it is important as far as possible to ensure no anisotropic properties of the recording medium, i.e. neither mechanical nor magnetic.

It is an object of the present invention to provide a magnetic recording medium of the generic type stated at the outset which, in the ready-to-use state, has neither magnetic nor mechanical anisotropy and at the same time has improved abrasion resistance and good mechanical stability.

SUMMARY OF THE INVENTION

We have found that this object is achieved, according to the invention, by a magnetic recording medium which is composed of at least two layers, the lower layer containing at least one acicular magnetic pigment and, after coating and before drying, said magnetic recording medium being disoriented by magnetic treatment so that the magnetic pigments are present in random distribution in the layer.

DETAILED DESCRIPTION OF THE INVENTION

The invention, i.e. the composition of the magnetic recording medium and the processes for its production, is described in more detail below.

Known films of polyesters, such as polyethylene terephthalate or polyethylene naphthalate, and polyolefins, cellulose triacetate, polycarbonates, polyamides, poly-imides, polyamidoimides, polysulfones, aramids or aromatic polyamides are suitable as nonmagnetic flexible substrates.

According to the invention, the lower layer contains acicular magnetic pigments whose magnetic values are adjusted so that they do not interfere with the recording of the upper magnetic layer. Such pigments and their preparation are described in more detail in PCT application 96/30900 of the same Applicant for the case of a magnetic recording medium oriented in the longitudinal direction or in the casting direction. These are preferably pigments of the formula

$Cr^aO_xnH_2O$ where
- a is the average valency of the chromium with $3.1 < a \leq 3.7$
- x is the oxygen equivalent resulting from the valency of the chromium
- n is the water content with $0 < n < (4-a)/2$ having a ratio of the average length of the needles to the average diameter of the needles of from 3:1 to 12:1 and a length of from 50 to 150 nm. The specific surface area is from 50 to 100 m$^2$/g and the coercive force H, is from 5 to 40, preferably from 5 to 25, kA/m. The preparation of these pigments is described in more detail in said PCT application so that there is no need to discuss them in more detail at this point. To ensure that the magnetic particles of the lower layer—referred to below as chromium oxide—move sufficiently in the magnetic disorientation zone, which will be described in more detail below, they must have an Hc of at least 25 kA/m and a specific powder magnetization of from 20 to 70 nTm$^3$/g.

The further components of the lower layer, such as polymeric binders, further pigments, antistatic agents, carbon blacks, lubricants, crosslinking agents, solvents, wetting agents, and dispersing assistants, are described in more detail in the abovementioned documents. For example, polyurethanes and vinyl polymers which, in a preferred embodiment, have polar groups, for example sulfonate groups, can be used as polymeric binders. Furthermore, lubricants, such as fatty acids or fatty esters, crosslinking agents, such as polyisocyanate, and wetting agents and solvents, such as tetrahydrofuran, methyl ethyl ketone, cyclohexanone or dioxane, may be present. Moreover, the lower layer may contain further nonmagnetic pigments, for example $TiO_2$, $SiO_2$, $Al_2O_3$, $BaSO_4$, boron nitride, $SnO_2$, $CaCO_3$, $ZrO_2$, TiC, SiC, $Sb_2O_3$, ZnO, $CeO_2$, carbon blacks and further pigments in addition to the magnetic pigment, but no acicular non-magnetic particles.

A ferromagnetic metal pigment or metal alloy pigment is present in high concentration in the upper magnetic layer. Examples of such magnetic pigments are likewise described in the abovementioned documents. The metal powder pigments contain, as main component, Fe, Ni and Co and, if required, Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Mn, Zn, Sr or B. Moreover, they may have a protective covering on their surface to prevent oxidation or to prevent other harmful effects. The metal powders have a specific BET surface area of 40–80 m$^2$/g, the axial length is not more than 200 nm and the axial diameter is 10–30 nm. The coercive force is greater than 100 kA/m and the magnetic moment is greater than 100 nTm$^3$/g. Furthermore, the upper magnetic layer contains the conventional additives, such as polymeric binders, which may also contain polar groups, or corresponding binder mixtures and dispersing assistants, non-magnetic pigments, lubricants, curing agents, conductivity-enhancing agents, wetting agents and solvents, all of which are known from the prior art.

The process for the preparation of the magnetic dispersion comprises at least one kneading stage, one dispersing stage and, if required, one mixing stage which may be provided before and after the preceding stages. The respective stages may each be composed of two or more steps. In the preparation of the composition, all starting materials, i.e. the ferromagnetic powder, the binders, the carbon blacks, the abrasives or supporting pigments, the antistatic agents, the lubricants, the wetting agents, the dispersing assistants and the solvents, may be added to the reactor unit right at the beginning of the process or later in the course of the process.

The individual starting materials can be divided into a plurality of portions, which are added to the process in two or more stages. For example, the polyurethane is divided into a plurality of portions and added in the kneading stage and in the dispersing stage and also in the mixing stage for adjusting the viscosity after dispersing. The crosslinking agent and, if required a crosslinking catalyst are preferably added after the dispersion has been prepared.

In order to achieve the object of the invention, it is also possible to use a known conventional technology as part of the process for the production of the novel magnetic recording medium. Thus, an apparatus having a high kneading force may be used, for example in the kneading stage, in order to obtain a magnetic recording medium having a high $B_r$ value.

After fine filtration through narrow-mesh filters having a mesh size of not more than 5 μm, the dispersions are applied by means of a conventional coating apparatus at speeds of 50–500 m/min, disoriented in a magnetic field zone and then dried and are subjected to a calender treatment and, if required, a further surface treatment.

The measurement of the quality of the dispersions for the upper and the lower layer is preferably carried out as described in the article Shear magnetometry for the analysis of magnetic tape dispersion, IEEE Trans. Magn. 32, (1996), 4048–4053.

Coating can be effected by means of bar coaters, blade coaters, knife coaters, extrusion coaters, reverse-roll coaters or combinations. The two layers can be applied simultaneously by the we/wet method or by the wet/dry method.

A knife coater having at least one outlet orifice, preferably two or more outlet orifices, which is disclosed in DE-A 195 04 930 of the same Applicant, is particularly preferred for the production of the novel magnetic recording media. Also suitable is an extrusion coater having at least one outlet orifice, preferably two or more outlet orifices, for the magnetic dispersions, the edge or the air gap of a magnet being opposite the orifices on the other side of the flexible substrate and the field lines of said magnet being essentially parallel to the running direction of the substrate. Such arrangements are disclosed in EP-B-0 654 165 or FR 2 734 500.

Disorienting magnetic field zones are disclosed, for example, in EP-B-121 093 and in PCT application 96/35210 of the same Applicant and in U.S. Pat. No. 5,455,093. A particularly preferred disorienting zone is described in said PCT application. It consists of a plurality of treatment zones arranged one after the other, in particular a) an orientation zone which contains a monopolar magnetic field which is constant as a function of time and whose direction is oriented perpendicularly to the plane of the substrate, b) a transition zone after the orientation zone a), in which the magnetic field of the orientation zone a) is continued and decreases in the direction of movement to not more than 10% of the field strength in the orientation zone a), and c) a field-free disorientation zone after the transition zone b), whose length is such that the magnetically anisotropic pigments undergo spontaneous disorientation in the liquid dispersion layer.

The magnetic arrangement for disorienting the magnetic recording medium consists of magnets which are arranged symmetrically on the two sides of a plane of symmetry which corresponds to the plane of the dispersion layer, in each case unlike magnetic poles being opposite one another with like adjacent magnetic poles in each half-space on either side of the plane of symmetry, so that the magnetization vectors are in the same direction, and the distance from the pole surfaces to the plane of symmetry is constant in the feed part of the arrangement and increases uniformly in the outlet part.

After the subsequent drying and calendering, the magnetic recording medium thus obtained is punched to give the desired circular shape for use and is subjected to the usual electromagnetic tests and the mechanical tests.

Particularly advantageous results are obtained when a very thin magnetic upper layer whose layer thickness is less than 0.4 μm is to be cast onto a magnetic lower layer whose layer thickness is preferably 0.8–2 μm.

The invention is now illustrated with reference to practical examples and comparative examples, but without restricting the invention to the specific formulation examples and the apparatus for the production of such a magnetic recording medium.

A preferred embodiment of the production of the novel recording medium is evident from the FIGURE.

The flexible substrate (2) running in the direction of the arrow passes through the knife coater means (1), consisting of lower block (6), upper block (4) and the middle part (7) and the coater slots in between, in which the first and second dispersions are applied to the substrate (2) as coating (8, 9). Opposite the outlet slots is the summit S of a rotatable coating roll (3), over which the substrate (2) passes.

After passing through the coating means, the coated substrate (2, 8, 9) with the dispersions in the wet state passes into the disorientation zone (11), described above and consisting of the zone a) with constant field, the zone b) with monotonically decreasing field and the field-free disorientation zone c). The arrangement of the magnets (12, 13) is also shown in the FIGURE.

EXAMPLE 1

A coating apparatus as described in more detail in DE-A 195 04 930 was used to produce magnetic recording medium consisting of a thin magnetic upper layer, which was cast onto a magnetic lower layer. The two layers are based on the following formulations:

| | Parts by weight |
|---|---|
| a) Composition of the lower layer | |
| Vinyl polymer having polar groups | 8 |
| Polyurethane having polar groups | 4 |
| Chromium oxide (73 m$^2$/g BET, H$_c$: 15 kA/m) | 63 |
| Al$_2$O$_3$ (primary particle size 0.4 μm) | 12 |
| Carbon black (primary particle size 30 nm) | 25 |
| Lubricant | 10.6 |
| Dispersing assistant | 2 |
| Crosslinking agent | 4 |
| Solvent (tetrahydrofuran, dioxane) | 416 |
| b) Composition of the upper layer | |
| Magnetic metal pigment (H$_c$ 132 kA/m, BET 60 m$^2$/g) | 100 |
| α-Al$_2$O$_3$ (primary particle size = 0.4 μm) | 10 |
| Vinyl polymer having polar groups | 10 |
| Polyurethane having polar groups | 10 |
| Carbon black (primary particle size = 25 nm) | 5 |
| Dispersing assistant | 1.1 |
| Lubricant | 15 |
| Crosslinking agent | 5 |
| Solvent (tetrahydrofuran, dioxane) | 600 |

The coating was carried out by the wet/wet method; a balanced PET film having a substrate thickness of 62 μm was coated. The dry thickness of the lower layer was 1.3 μm and that of the upper layer 0.3 μm. After coating of the two layers, disorientation of the magnetic recording medium was carried out in a zone as described in PCT application 96/35210, Example 1, while the layers were in the wet state. Coating was carried out in on both sides in two passes through the coating apparatus described, at a coating speed of 70 m/min. After drying, the magnetic recording medium was calendered in a customary manner. Disk-shaped magnetic recording media were punched from the finished rolled-up coating web and were completed in a customary manner.

The resulting magnetic layer was isotropic, i.e. without a preferred magnetic direction. The measured percentage modulation of the full sine wave of U$_L$ was 0–1.2%; orientation ratios of 0.98–1.02 were measured for web samples using a conventional web rating-sample magnetometer. The center line average value R$_a$ was 3–4 nm, measured by interferometry using an apparatus of the type Topo 3 D from Wyko.

COMPARATIVE EXAMPLE 1

The procedure was as in Example 1, but without magnetic disorientation of the cast layers.

The resulting magnetic layer was anisotropic with a magnetically light axis in the X direction. The orientation-dependent percentage modulation of U$_L$ was 0–3%, on average 1%. Orientation ratios of 0.95–1.06 were measured. The center line average value had deteriorated compared with Example 1.

EXAMPLE 2

The composition of the lower and of the upper layer was as in Example 1, except that coating was carried out by the wet/dry method, in which first the lower coat was cast onto the substrate as in Example 1 and then the layer was disoriented, dried and calendered. The upper layer was then cast onto the lower layer and treated in the same manner. The coating of the other side of the substrate was carried out in a similar manner.

The following values were measured with the magnetic recording medium thus produced:

| | |
|---|---|
| Gloss | 160–170 (60 °) |
| Center line average value (R$_a$) | 3–4 nm |
| H$_c$ | 121–126 kA/m |
| Orientation ratio | 0.98–1.02 |

EXAMPLE 3

| a) Composition of the lower layer | Parts by weight |
|---|---|
| Vinyl polymer having polar groups | 9 |
| Polyurethane having polar groups | 9 |
| Chromium oxide (BET 70 m$^2$/g, 1-110 nm, H$_c$ 23 kA/m) | 28 |
| Al$_2$O$_3$ (primary particle size 0.4 μm) | 20 |
| Carbon black (primary particle size 24 nm) | 25 |
| TiO$_2$ (primary particle size 30 nm) | 27 |
| Dispersing resin having polar groups | 7 |
| Dispersing assistant | 2 |

-continued

| a) Composition of the lower layer | Parts by weight |
|---|---|
| Lubricant | 11.6 |
| Crosslinking agent | 5 |
| Solvent (tetrahydrofuran, dioxane) | 416 |

The composition of the upper layer was as in Example 1.

The procedure was as described in Example 1. Testing of the magnetic and the mechanical values of the disk-shaped magnetic recording medium thus produced gave values as good as those in Example 1.

EXAMPLE 4

The procedure was as in Example 3, except that the magnetic disorientation treatment was carried out by means of an apparatus as described in Example 1 of U.S. Pat. No. 5,455,093, i.e. by means of a first alternating magnetic field having a strength of 200 gauss and a frequency of 50 hertz and a second field having a strength of 1.20 gauss and a frequency of 50 hertz, in order to carry out the disorientation.

Values similar to those in Example 3 were achieved.

EXAMPLE 5

The procedure was as in Example 3, but the magnetic disorientation zone consisted of an arrangement as described in the abovementioned EP-B-0 121 093, i.e. the liquid magnetic double layer first passes through an arrangement according to FIG. 9 for orienting the magnetizable particles perpendicularly, which arrangement is then followed by an arrangement according to FIG. 5 for disorienting the magnetizable particles while the dispersion is still in the liquid state.

Values similar to those in Example 3 were obtained.

COMPARATIVE EXAMPLE 2

The procedure was as in Example 1, except that the 63 parts by weight of the magnetic chromium oxide were replaced by equal parts of a nonmagnetic chromium oxide having the same particle size and a $H_c$ of <0.5 kA/m.

The result was a magnetic recording medium in which the center line average value of the layer surface had deteriorated.

EXAMPLE 6

The composition of the lower layer was as in Example 3 but the upper layer had the following composition:

| Upper layer | Parts by weight |
|---|---|
| Magnetic pigment ($H_c$ 145 kA/m, BET 60 m$^2$/g) | 100 |
| α-Al$_2$O$_3$ (primary particle size = 0.4 µm) | 10 |
| Vinyl polymer having polar groups | 7 |
| Polyester-polyurethane having polar groups | 3 |
| Carbon black (primary particle size 30 nm) | 5 |
| Dispersing assistant | 1.2 |
| Lubricant | 15 |
| Crosslinking agent | 5 |
| Solvent (tetrahydrofuran, dioxane) | 600 |

The procedure was as in Example 1, except that the thickness of the upper layer was 0.15 µm.

The circular magnetic recording medium thus produced had good mechanical and magnetic properties. It was possible to produce floppy disks for applications with a storage capacity of substantially more than 100 megabytes.

We claim:

1. A magnetic recording medium consisting of a nonmagnetic substrate on which at least one lower layer which contains at least one acicular pigment which is dispersed in a binder and an upper layer which contains a ferromagnetic metal powder which is dispersed in a binder are applied, the thickness of the upper layer being not more than 0.4 µm, wherein the lower layer contains an acicular magnetic chromium oxide of the formula $Cr^aO_xnH_2O$ wherein a is the average valency of the chromium with $3.1<a\leq3.7$, x is the oxygen equivalent resulting from the valency of the chromium, n is the water content with $0<n<(4-a)/2$, with a ratio of the average length to the average diameter of at least 3 and with a coercive force $H_c$ of 5–25 k/Am, and wherein the magnetic recording medium is subjected to a magnetic disorientation treatment immediately after application of the layers while the latter are in the wet state.

2. A recording medium as claimed in claims 1, wherein the magnetic pigment in the lower layer has a magnetization of not more than 70 nTm$^3$/g.

3. A recording medium as claimed in claim 1, wherein the magnetic metal powder in the upper layer has a needle length of less than 200 nm and an $H_c$ greater than 100 kA/m.

4. A magnetic recording medium as claimed in claim 1, wherein the thickness of the lower layer is 0.5–8 µm.

5. A magnetic recording medium as claimed in any of claim 1, wherein, in addition to the acicular magnetic pigment in the lower layer, at least one further nonacicular nonmagnetic pigment is also present.

6. A magnetic recording medium as claimed in claim 5, wherein the further pigment in the lower layer is a carbon black having a primary particle diameter of less than 100 nm.

7. A magnetic recording medium as claimed in claim 5, wherein the further nonmagnetic pigment is selected from finely divided Al$_2$O$_3$, TiO$_2$, SiO$_2$, BaSO$_4$, boron nitride, SnO$_2$, CaCO$_3$, ZrO$_2$, TiC, SiC, Sb$_2$O$_3$, ZnO, CeO$_2$ and other nonacicular particles.

8. A magnetic recording medium as claimed in claim 5, wherein the further pigment in the lower layer is a carbon black having a primary particle diameter of less than 40 nm.

9. A magnetic recording medium as claimed in claim 1, wherein the medium is a floppy disk having a storage capacity of more than 100 megabytes.

10. A process for the production of a magnetic recording medium as claimed in claim 1, wherein the two magnetic layers, after they have been applied while the dispersions are in the wet state, pass through a disorientation apparatus consisting of an orientation zone which contains a monopolar magnetic field which is constant as a function of time and whose direction is oriented perpendicularly to the plane of the substrate, a subsequent transition zone in which the magnetic field of the first orientation zone is continued and decreases in the direction of movement of the coated substrate to not more than 10% of the field strength in the first orientation zone, and a subsequent field-free disorientation zone after the transition zone, whose length is such that the magnetically anisotropic pigments undergo spontaneous disorientation in the liquid dispersions.

11. A process for the production of a magnetic recording medium as claimed in claim 10, wherein the disorientation apparatus consists of two alternating magnetic fields, the first field having a higher field strength than the second one.

12. A process for the production of a magnetic recording medium as claimed in claim 10, wherein the disorientation apparatus comprises a first magnet in which the anisotropic particles are brought into the perpendicular position, which magnet is followed by a second arrangement consisting of small magnetic plates which are arranged on both sides of the substrate and whose outer magnetic field acts essentially perpendicular to the substrate, the field orientation in the coating direction continuously changing by 180° with a simultaneous decrease in the field strength.

* * * * *

UNITED STATES PATENT AND TRADEMARK OFFICE
CERTIFICATE OF CORRECTION

PATENT NO. : 6,235,368 B1  
DATED : May 22, 2001  
INVENTOR(S) : Wiegemann et al.

Page 1 of 1

It is certified that error appears in the above-identified patent and that said Letters Patent is hereby corrected as shown below:

<u>Column 8, claim 2,</u>  
Line 24, "claims 1" should be -- claim 1 --.

<u>Column 8, claim 5,</u>  
Line 32, delete "any of".

Signed and Sealed this

Thirteenth Day of November, 2001

*Attest:*

*Nicholas P. Godici*

*Attesting Officer*

NICHOLAS P. GODICI  
*Acting Director of the United States Patent and Trademark Office*